No. 890,684. PATENTED JUNE 16, 1908.
J. F. MOUL.
APPARATUS FOR HEATING, COOLING, AND PASTEURIZING LIQUIDS.
APPLICATION FILED MAY 9, 1907.
2 SHEETS—SHEET 1.
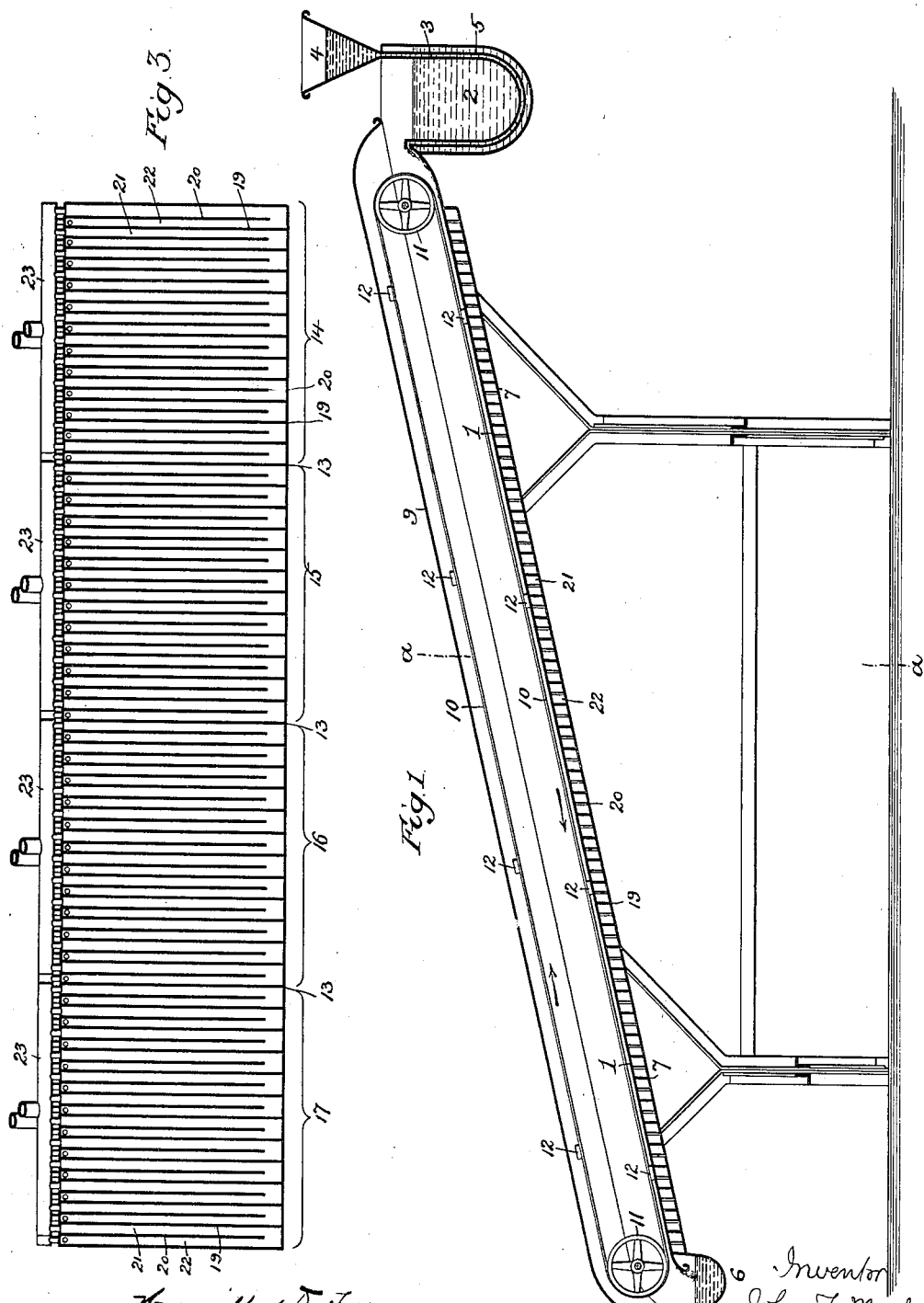

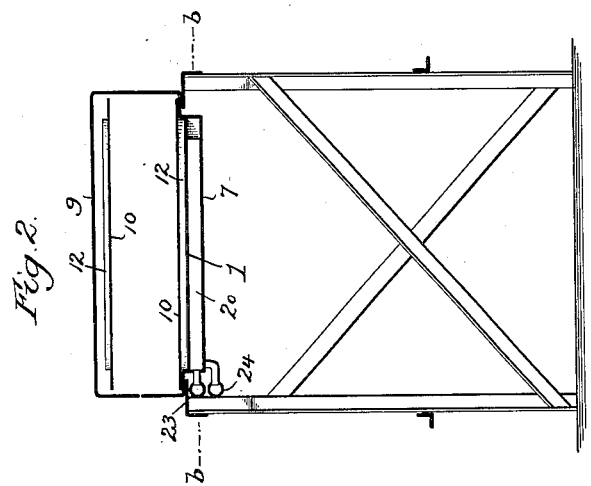
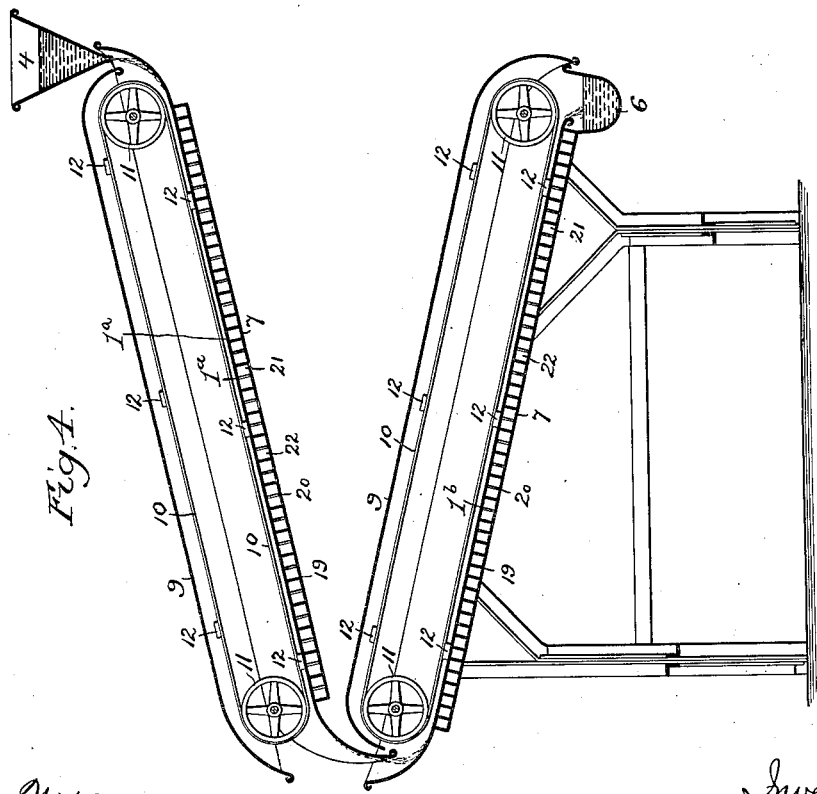

UNITED STATES PATENT OFFICE.

JOHN F. MOUL, OF OSNABURG, OHIO, ASSIGNOR OF ONE-HALF TO FRANK TYSON, OF CANTON, OHIO.

APPARATUS FOR HEATING, COOLING, AND PASTEURIZING LIQUIDS.

No. 890,684.

Specification of Letters Patent.

Patented June 16, 1908

Application filed May 9, 1907. Serial No. 372,836.

*To all whom it may concern:*

Be it known that I, JOHN F. MOUL, a citizen of the United States, residing at Osnaburg, Ohio, have invented certain Improvements in Apparatus for Heating, Cooling, or Pasteurizing Liquids, of which the following is a specification.

The object of my invention is to provide apparatus for the rapid and effective heating, cooling, or pasteurization of milk or other liquids, an object which I attain in the manner hereinafter set forth, reference being had to the accompanying drawings, in which Figure 1 is a longitudinal sectional view of pasteurizing apparatus constructed in accordance with my invention; Fig. 2 is a transverse section of the same, on the line $a$—$a$, Fig. 1; Fig. 3 is a sectional plan view on the line $b$—$b$, Fig. 2, and Fig. 4 is a view illustrating a modified form of the apparatus.

Referring in the first instance to Figs. 1, 2, and 3 of the drawing, 1 represents an inclined table, shelf, trough or platform (hereinafter, for convenience, referred to as a table) which is provided at its upper end with a trough 2 having triple walls providing an outer chamber 5 and an inner passage 3, the latter receiving from a funnel 4 the milk or other liquid to be treated, this liquid being hereinafter, for convenience, referred to as milk. The outer chamber 5, together with the trough 2, contains hot or cold water, or other fluid, whereby the preliminary heating or cooling of the milk can be effected, the space between the inner and intermediate walls of the trough providing a contracted passage through which the milk is caused to flow in a thin film and in which, during its passage, it is subjected upon both sides to the action of the fluid contained in the trough 2 and jacket 5. The milk thus subjected to preliminary heating or cooling is discharged over the upper edge of the trough onto the upper end of the table 1 and flows, still in a thin film, down said table and into a trough 6 at the lower end of the same, being, in its passage, subjected to the influence of fluids which are contained in a jacket 7 beneath the table 1 and are caused to circulate through said jacket in the manner hereinafter described.

The table is, by preference, provided with a protective hood 9, and between the table and the hood operates an endless belt or apron 10 mounted upon suitable supporting pulleys or drums 11 at the upper and lower ends of the table and provided with transverse slats 12, which, in traversing the lower run of the belt are in contact with the surface of the table 1 and thus serve not only to regulate the rate of flow of the milk over said table 1 but also to prevent said milk from adhering to the table and becoming burned or scorched while traversing these portions of the table which are subjected to heat.

In the apparatus shown in the drawing the jacket 1 is divided by suitable partitions 13 into four chambers, 14, 15, 16 and 17, and each of these chambers is again sub-divided by partitions 19 and 20 into a series of transverse passages 21 and 22, communicating with each other at one end around the ends of the short transverse partitions 20, the opposite end of each passage 21 communicating, through a short branch, with a manifold pipe 23, and a corresponding end of each passage 22 communicating, through a like branch, with a manifold pipe 24, whereby fluid supplied by the pipe 23 is conveyed to each of the passages 21 of that section of the jacket corresponding to said pipe, while the pipe 24 corresponding to said section receives the fluid after it has traversed the passages 21 and 22.

In pasteurizing milk or other liquids it is preferable to first gradually heat the same and then to gradually cool it, and in order to effect this result the passages of the upper section 14 of the jacket may be supplied with hot water, those of the section 15 with steam, those of the section 16 with cold water, and those of the section 17 with chilled brine, the arrangement of pipes and passages which I have shown providing for a substantially uniform heating or cooling of the table throughout the extent of each section of the jacket, although, if desired, the heating or cooling agent may pass continuously from one end of the section to the other in a zigzag or circuitous course by providing the pipe 23 with a single branch at one end of the section and the pipe 24 with a single branch at the opposite end of the section.

In cases where the heating or cooling only of the liquid is to be effected the jacket will, of course, be supplied only with heating or cooling fluid, and in this case the jacket may have but a single chamber, or a plurality of chambers, as desired, each chamber, by preference, being provided with partitions for forming a circuitous or zigzag passage or passages for the heating or cooling fluid.

In the apparatus shown in Fig. 4 upper and lower tables 1$^a$ and 1$^b$, each provided with a slatted belt 10, are used, the upper table being intended as a heating table and the lower table as a cooling table, and each table being provided with a partitioned jacket for effecting circulation of the heating or cooling agent beneath the same in the manner described. In the apparatus shown in Fig. 4 also, the preliminary heater or cooler is dispensed with, the milk being fed directly from the trough or funnel 4 onto the upper end of the upper table 1$^a$ and passing from the lower end of the same onto the upper end of the lower table 1$^b$, from whose lower end it is discharged into the receiving trough 6, each table being provided with a protecting hood 9.

I claim:—

1. In apparatus for heating or cooling liquids, the combination of a table over which the liquid is caused to flow by gravity, means for heating or cooling said table, means for supplying a shallow stream of liquid to the head of the table and an endless belt having slats moving in the direction of the flow of the liquid and serving to regulate said flow.

2. In apparatus for heating or cooling liquids, the combination of a table over which the liquid is caused to flow by gravity, means for heating or cooling said table, means for supplying a shallow stream of liquid to the head of the table and an endless belt having slats moving in the direction of the flow of the liquid and serving to regulate said flow, said slats contacting with the surface of the table so as to act also as scrapers therefor.

3. In apparatus for heating or cooling liquids, the combination of a table over which the liquid is caused to flow by gravity, means for heating or cooling the table, and a preliminary heater or cooler from which the liquid is discharged onto the table, said preliminary heater or cooler consisting of a triple walled trough providing a passage for the liquid with chambers for the heating or cooling agent on each side thereof whereby the liquid is treated in the form of a thin film, and is discharged in a shallow stream over the head of the table.

4. In apparatus for heating or cooling liquids, the combination of a table over which the liquid is caused to flow by gravity, means for regulating the flow of liquid over said table, means for heating or cooling the table, and a preliminary heater or cooler from which the liquid is discharged onto the table, said preliminary heater or cooler consisting of a triple walled trough providing a passage for the liquid with chambers for the heating or cooling agent on each side thereof whereby the liquid is treated in the form of a thin film, and is discharged in a shallow stream over the head of the table.

5. In apparatus for pasteurizing liquids, the combination of a table over which the liquid is caused to flow by gravity, means for regulating the flow of liquid over said table, means for supplying a shallow stream of liquid to the head of the table, means for heating that portion of the table which first receives the liquid, and means for cooling the following portion of the table.

6. In apparatus for pasteurizing liquids the combination of a table over which the liquid is caused to flow by gravity, an endless belt disposed above said table and having slats which regulate the flow of liquid over the table, means for supplying a shallow stream of liquid to the head of the table, means for heating that portion of the table which first receives the liquid, and means for cooling the following portion of the table.

7. Pasteurizing apparatus in which are combined a table over which the liquid is caused to flow by gravity, an endless belt disposed above said table and having slats which regulate the flow of liquid over the same, and also contact with the table and act as scrapers, means for supplying a shallow stream of liquid to the head of the table, means for heating that portion of the table which first received the liquid, and means for cooling the following portion or the table.

8. In apparatus for heating or cooling liquids, the combination of a jacketed table over which the liquid is caused to flow by gravity, means for dividing said jacket into chambers, means for supplying the heating or cooling agent to said chambers independently, means for supplying liquid in a shallow stream to the head of the table and means for restricting the rate of the flow of the liquid over the table.

9. In apparatus for heating or cooling liquids, the combination of a jacketed table over which the liquid is caused to flow, partitions whereby said jacket is divided into a succession of independent flow passages, means for supplying heating or cooling liquid to said passages independently, means for supplying liquid in a shallow stream to the head of the table and means for restricting the rate of the flow of the liquid over the table.

10. In apparatus for heating or cooling liquids, the combination of a jacketed table over which the liquid is caused to flow by gravity, one or more partitions whereby said jacket is divided into a plurality of chambers, other partitions whereby each chamber is divided into a succession of independent flow passages, and means for supplying a heating or cooling agent to said flow passages independently.

In testimony whereof, I have signed my name to this specification, in the presence of two subscribing witnesses.

JOHN F. MOUL.

Witnesses:
CLAUDE CLENDENING,
WM. SIMPSON.